(12) United States Patent
Cengarle et al.

(10) Patent No.: US 12,469,516 B2
(45) Date of Patent: Nov. 11, 2025

(54) DETECTION AND ENHANCEMENT OF SPEECH IN BINAURAL RECORDINGS

(71) Applicants: DOLBY LABORATORIES LICENSING CORPORATION, San Francisco, CA (US); DOLBY INTERNATIONAL AB, Dublin (IE)

(72) Inventors: Giulio Cengarle, Barcelona (ES); Yuanxing Ma, Beijing (CN)

(73) Assignees: DOLBY LABORATORIES LICENSING CORPORATION, San Francisco, CA (US); DOLBY INTERNATIONAL AB, Dublin (IE)

(*) Notice: Subject to any disclaimer, the term of this patent is extended or adjusted under 35 U.S.C. 154(b) by 139 days.

(21) Appl. No.: 18/327,671

(22) PCT Filed: Jan. 12, 2022

(86) PCT No.: PCT/US2022/012128
§ 371 (c)(1),
(2) Date: Jun. 1, 2023

(87) PCT Pub. No.: WO2022/155205
PCT Pub. Date: Jul. 21, 2022

(65) Prior Publication Data
US 2025/0078858 A1     Mar. 6, 2025

Related U.S. Application Data

(60) Provisional application No. 63/245,548, filed on Sep. 17, 2021, provisional application No. 63/162,289, filed on Mar. 17, 2021.

(30) Foreign Application Priority Data

Jan. 12, 2021   (ES) .................. ES202130013

(51) Int. Cl.
*G10L 21/0364*     (2013.01)
*G10L 21/034*      (2013.01)
(Continued)

(52) U.S. Cl.
CPC ........ *G10L 21/0364* (2013.01); *G10L 21/034* (2013.01); *G10L 25/51* (2013.01); *G10L 25/78* (2013.01)

(58) Field of Classification Search
CPC ... G10L 21/0364; G10L 21/034; G10L 25/51; G10L 25/78
(Continued)

(56) References Cited

U.S. PATENT DOCUMENTS 6,496,797 B1 * 12/2002 Redkov ................ G10L 19/08
                                                    704/223
6,549,633 B1    4/2003 Westermann
(Continued)

FOREIGN PATENT DOCUMENTS

| JP | 2005203981 A | 7/2005 |
|----|--------------|--------|
| JP | 2010038943 A | 2/2010 |
| JP | 2013121196 A | 6/2013 |

OTHER PUBLICATIONS

Bredin, H. et al."Pyannote.Audio: Neural Building Blocks for Speaker Diarization" IEEE icassp 2020, pp. 7124-7128, 5 pages.
(Continued)

*Primary Examiner* — Thjuan K Addy

(57) ABSTRACT

Disclosed herein are method, systems, and computer-program products for segmenting a binaural recording of speech into parts containing self-speech and parts containing external speech, and processing each category with different settings, to obtain an enhanced overall presentation. The segmentation is based on a combination of: i) feature-based frame-by-frame classification, and ii) detecting dissimilarity
(Continued)

by statistical methods. The segmentation information is then used by a speech enhancement chain, where independent settings are used to process the self- and external speech parts.

15 Claims, 2 Drawing Sheets

(51) Int. Cl.
  *G10L 25/51* (2013.01)
  *G10L 25/78* (2013.01)
(58) Field of Classification Search
  USPC .............................. 381/1, 2, 11, 13, 300, 303
  See application file for complete search history.

(56) References Cited

U.S. PATENT DOCUMENTS

| | | | |
|---|---|---|---|
| 10,834,516 | B2 | 11/2020 | Lyren |
| 2011/0261983 | A1 | 10/2011 | Claussen |
| 2012/0128164 | A1 | 5/2012 | Blamey |
| 2015/0245150 | A1 | 8/2015 | Jepsen |
| 2016/0192090 | A1 | 6/2016 | Gran |
| 2016/0261961 | A1 | 9/2016 | Andersen |
| 2017/0055090 | A1 | 2/2017 | Gran |
| 2017/0061978 | A1* | 3/2017 | Wang ............... G10L 21/0232 |
| 2018/0255408 | A1 | 9/2018 | Pedersen |
| 2019/0075406 | A1 | 3/2019 | Petersen |
| 2019/0110135 | A1 | 4/2019 | Jensen |
| 2019/0182607 | A1 | 6/2019 | Pedersen |

OTHER PUBLICATIONS

Breebaart, J. et al., "Parametric Coding of Stereo Audio" EURASIP Journal of Signal Processing, Jun. 2005, pp. 1305-1323, 19 pages.
Chen, S.S. et al "Speaker, environment and channel change detection and clustering via the Bayesian Information Criterion". In: Proceedings of the DARPA Broadcast News Transcription and Understanding Workshop, Lansdowne, VA, 1998, pp. 1-6, 6 pages.
https://web.archive.org/web/20201203102922/https://dolby.io/products/media-processing/ is a snapshot as of Dec. 3, 2020. 9 pages.
https://web.archive.org/web/20201210021359/https://www.izotope.com/en/products/rx.html is a snapshot as of Dec. 10, 2020. 12 pages.
Huijbregts M et al: "Robust speech/non-speech classification in heterogeneous multimedia content", Speech Communication, Elsevier Science Publishers , Amsterdam, NL, vol. 53, No. 2, Feb. 1, 2011 (Feb. 1, 2011), pp. 143-153, XP027524728.
Logan, Beth "MEL Frequency Cepstral Coefficients for Music Modeling" Cambridge Research Laboratory. Nov. 2000. pp. 1-13, 13 pages.
Wood, Sean U.N, et al "Binaural Codebook-Based Speech Enhancement With Atomic Speech Presence Probability" IEEE/ACM Transactions on Audio, Speech, and Language Processing, vol. 27, Issue 12, Dec. 2019, pp. 2150-2161, 12 pages.

\* cited by examiner

DETECTION AND ENHANCEMENT OF SPEECH IN BINAURAL RECORDINGS

CROSS-REFERENCE TO RELATED APPLICATIONS

This application is a U.S. National Stage application under U.S.C. 371 of International Application No. PCT/US2022/012128, filed on Jan. 12, 2022 (reference: D20135WO01), which claims priority to U.S. Provisional Application Nos. 63/162,289 and 63/245,548, filed Mar. 17, 2021 and Sep. 17, 2021, respectively; and Spanish Patent Application No. P202130013, filed Jan. 12, 2021, each of which is incorporated by reference in its entirety.

TECHNICAL FIELD

The present disclosure relates to a method for enhancement of speech in binaural recordings, a system for performing the method and a non-transitory computer readable medium storing instructions for performing the method.

BACKGROUND

Earbuds are wireless in-ear headphones that pair with smart devices such as phones and tablets; they are becoming a popular choice for smartphone users to listen to audio and, since the addition of built-in microphones, to capture their voice for real-time communications or recording voice messages. Earbuds are a convenient alternative to record speech without a dedicated microphone, for people who want to conduct interviews, create video-log (vlog) or podcast content, or simply record voice notes.

SUMMARY OF THE INVENTION

In this disclosure, the expression "self-speech" is used to refer to the speech of the person wearing the earbuds, and the expression "external speech" to refer to speech from other people than the person wearing the earbuds.

Since the microphones are located in the ears of the person wearing the earbuds, when recording self-speech the propagation of sound from the mouth to the earbuds, combined with the directivity of the mouth, causes significant modifications to the spectrum of the voice-namely a loss of high-frequency energy compared to what a traditional microphone positioned in front of the mouth would pick up. When recording external speech, the distance of each external speaker results in a loss of level compared to the loudness of the self-speech. Both these factors (the loss of level and the loss of high frequencies) lead to a significant difference in loudness and tonality between self- and external speech. Compensation of these effects benefits from identification of self- and external speech, segmentation of the recording, and processing each part with optimal settings.

Speaker segmentation and diarization have been active fields of research for years, with well-established statistical approaches such as the Bayes Information Criterion (BIC), and recent AI-based techniques. While these techniques are effective in detecting a change of speaker or acoustic conditions, they do not provide additional information such as whether the speech is self or external. In particular, they work on monoaural signals (single-channel recordings), hence they do not account for the spatial aspects of sound, as embedded in a binaural recording. It turns out that spatial aspects such as the direction of arrival and the similarity between the signals at the Left and Right binaural microphones contain important information for the task of differentiating self- from external speech, but such cues are usually ignored for segmentation purposes.

While automatic solutions for speech enhancement exist, they do not detect nor use speaker segmentation information, hence they do not allow for optimal, tailored processing of self- and external speech to achieve balanced tonality and loudness.

This disclosure describes a method to improve a binaural recording of speech by identifying the parts corresponding to self- and external speech, segmenting the recording accordingly, and subsequently applying independent enhancement to each segment, with optimal settings according to the self- or external speech condition.

Taking a binaural signal as the input, a time-frequency transform is applied to divide the signal into frequency bands. In parallel, the signal is sent to a Voice Activity Detector to identify which parts of the signals contain speech, to avoid processing non-speech parts.

Spectral features are extracted from the time-frequency representation of the signal and are used for classification into self- and external speech on a frame-by-frame basis. In parallel, some of these features are sent to the Dissimilarity Segmentation unit, which uses statistical methods to find the frames where a change in speaker identity or acoustic condition took place. A Segmentation unit receives the information from the Classification and Dissimilarity Segmentation units and combines them by majority voting into a decision (self or external) for each segment. Segmentation is used to process a recording as a plurality of independent recordings, each with appropriate settings derived from the classification into self- and external speech.

BRIEF DESCRIPTION OF DRAWINGS

The embodiments of the present invention will be described in more detail with reference to the appended drawings.

DETAILED DESCRIPTION

Time-Frequency Transformation and Feature Extraction

Figure 1:
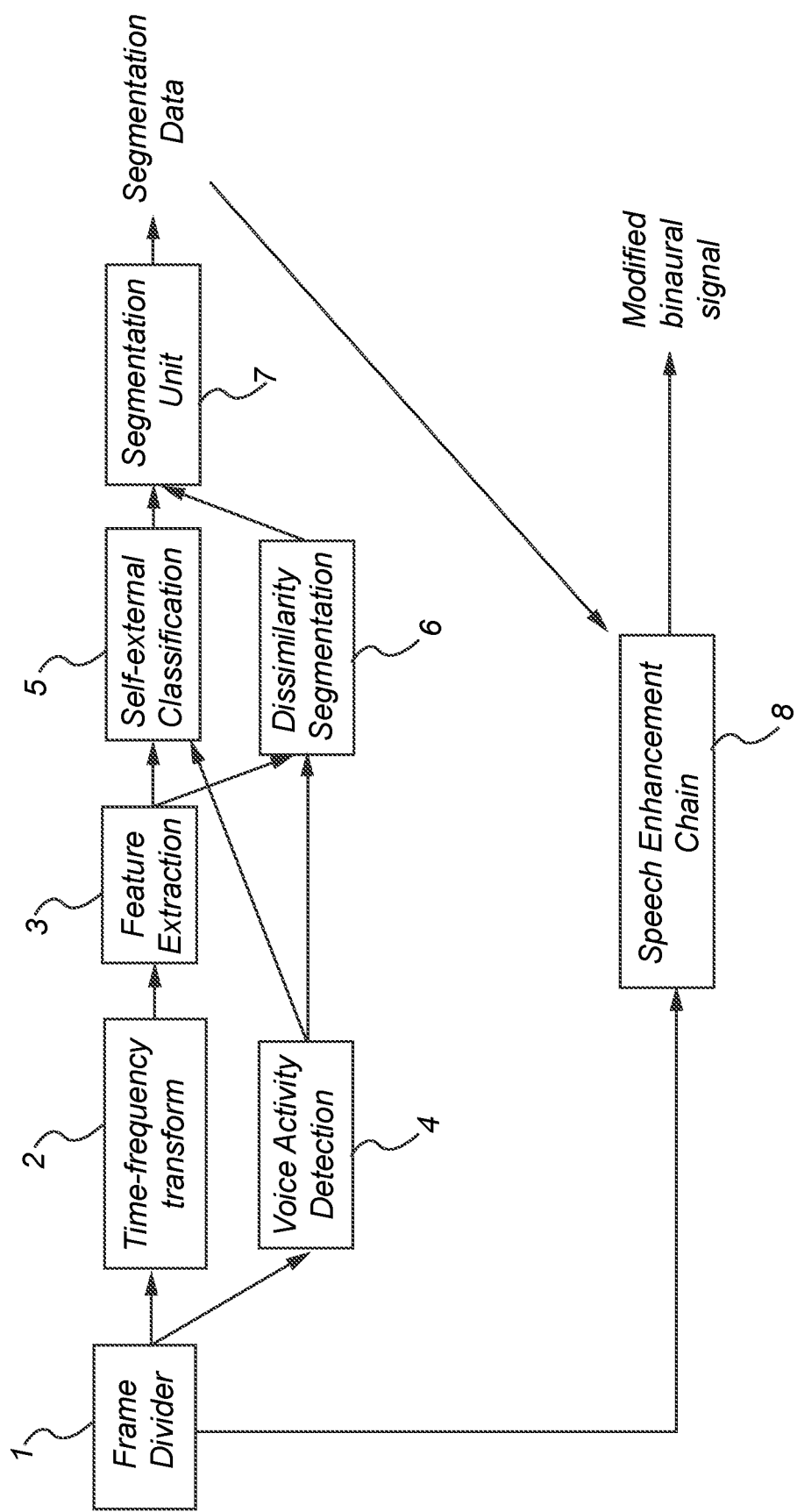
FIG. 1 provides a schematic block diagram of a speech-enhancement system, according to an embodiment of present invention.
Figure 2:
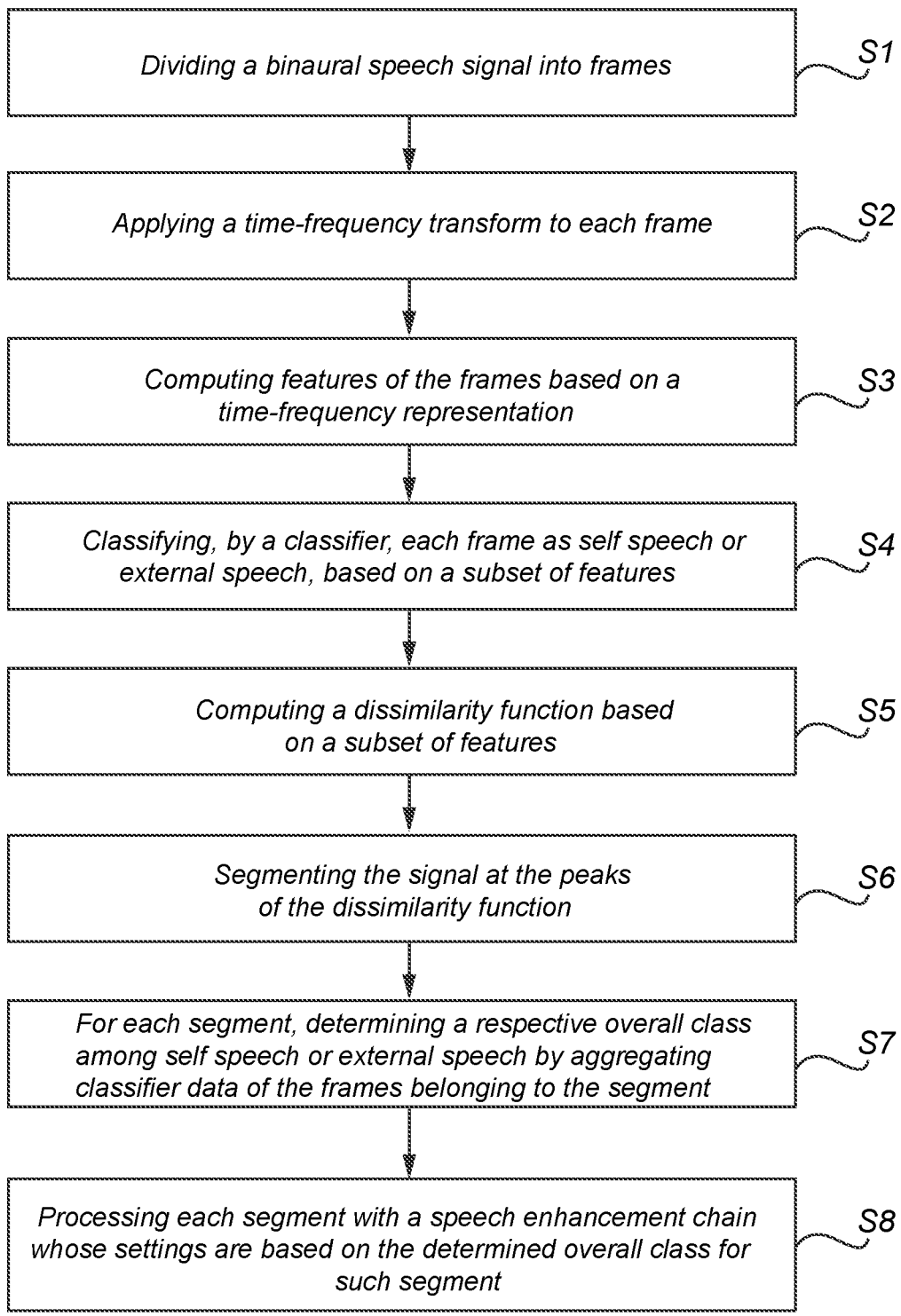
FIG. 2 is a flowchart of an example process of segmenting the signal according to an embodiment of the present invention.

In FIGS. 1-2, a binaural signal s(t) consisting of left and right signals l(t), r(t) has been obtained. The binaural signal may have been acquired in various ways, including recording by earpods worn by a user. The binaural signal has then ben received by the device on which the speech enhancement system is running. This device may be part of a device worn by the user, or may be a separate device. In the latter case, the binaural signal has been transmitted to this separate device.

The system in FIG. 1 includes a frame divider 1 connected to receive the binaural signal and divide it into frames. A Time-Frequency Transform unit 2 is connected to receive the frames, and is followed by a feature extraction unit 3. A voice activity detector (VAD) 4 is connected in parallel to the units 2 and 3, and also connected to receive the frames of the binaural signal. The outputs of the feature extraction unit 3 and the VAD 4 are both connected to two blocks; a self-classification block 5 and a dissimilarity segmentation block 6. The outputs from blocks 5 and 6 are both provided to a segmentation unit 7. Further, a speech enhancement chain 8 is connected to receive the frames of binaural signal from the frame divider 1 and the output from the segmentation unit 7. The speech enhancement chain 8 outputs a modified binaural signal. The operation of the system and its various components will be described in more detail in the following, referring also to the flowchart in FIG. 2.

In step 1, the binaural signal s(t) is divided into frames i by the frame divider 1. Then, in step S2, the Time-Frequency Transform Unit 2 receives the frames, and produces signals L(i, f), R(i, f), with indices of frames i=1: N and frequencies f=1: M. The time-frequency transform can for example be a Discrete Fourier transform, a QMF Filterbank, or a different transform.

In step S3, the frame divided signals L(i, f), R(i, f) are grouped into frequency bands, and in each frequency band b the following features are computed by the feature extraction unit 3:

the Energy per band $E(i, b)=\Sigma_{f\in b}(L^2(i, f)+R^2(i,f))$;
the Inter-channel Coherence IC (i, b);
the Mel-Frequency Cepstral Coefficients MFCC(i, b)

Since the present analysis is focused on speech, typically only the bands in the frequency range of speech, e.g. between 80 Hz and 4 kHz, are retained.

In addition, the spectral slope SS(i) is computed as the slope of the linear fit of E (i, b) in the frequency range of interest.

The spectral slope is a measure of how much the high frequencies are attenuated, hence it suits the task of discriminating self- and external speech.

The Inter-channel Coherence is a measure of the similarity between L and R; L and R can be expected to be almost identical for self-speech, given the symmetry of propagation from the mouth to the L and R microphones, while a dissimilarity for external speech is expected in typical conditions.

The MFCC are commonly used features for speech-related analysis and classification.

In parallel to step S3 (and not shown in FIG. 2), the frames of s(t) are sent to the VAD 4, which outputs the probability V(i) of containing speech for each frame of audio i, where $0 \leq V(i) \leq 1$. If the VAD operates on mono signals, a downmix such as l(t)+r(t) is used instead of s(t).

Self- and External Speech Classification

In step S4, the self-external classification unit 5 receives the features E(i, b), SS(i, b), IC(i, b) from the feature extraction unit 3 and produces the binary classification result C(i), i.e. C(i)=1 for self-speech and C(i)=0 for external speech. The classification is performed by a trained classifier, such as a Support Vector Machine (SVM). Training the of classifier may be performed with a set of labelled content where the input is the aforementioned feature vector and the output class is a given prior, for each frame of audio. The SVM is chosen as it is a powerful non-linear classifier that requires less training data than a deep neural network.

For improved performance, only frames containing audio are passed to the SVM, both during training and during classification. In the illustrated example, the classification unit 5 also receives the speech probability V from the VAD 4. This allows the classification unit 5 to pass only frames with a probability V exceeding a given threshold to the SVM.

The accuracy of the classifier can vary depending on the presence of noise, different speaker types, etc. Being a frame-by-frame decision, a method for segmenting the signal based on this classification may be provided.

Alternatively or additionally, the self-external classification unit 5 receives bone-conduction vibration sensor data from a bone-conduction sensor (not shown) and produces the binary classification result C(i) based, at least in part, on the bone-conduction vibration sensor data. For instance, the classification based on bone-conduction vibration sensor data may be performed by determining whether the bone-conduction vibration sensor data exceeds a predetermined threshold value which may be an indication that the audio is self-speech whereas bone-conduction vibration sensor data which does not exceed the predetermined threshold value may be an indication of external speech. The bone-conduction vibration sensor data may be used as an alternative or complement to the features output from the feature extraction unit 3 and the speech probability V from the VAD 4.

Dissimilarity Segmentation

This dissimilarity segmentation unit 6 also receives the MFCC(i, b) features and the VAD information V(i) and defines, in step S5, a threshold th for voice detection, so that all frames where V(i)<th are discarded. The rows k of discarded frames are removed from the matrix MFCC(i, b) and a Bayes Information Criterion (BIC) method is applied to the remaining frames j, to obtain a dissimilarity function D(j) according to conventional notation. A BIC window length corresponding to the minimum length of interest for segmentation (e.g. 2 s) may be used. The transitions in the speech signal are then obtained by finding the peaks in D(j), under the conditions that: i) peaks should be higher than a pre-defined threshold $th_D$, and ii) peaks should be separated by a minimum number of frames Δj, usually corresponding to the BIC window length.

After finding the peaks in the speech-only frames, their positions are mapped back to the full-set of frames, so that the transitions are referenced to the time of the original signal.

Note that Dissimilarity Segmentation detects not only the transitions between self- and external speakers, but also any other change of speaker or acoustic conditions; even for the transition between self- and external speech, it does not provide information on which is which.

Segmentation

The segmentation unit 7 receives the self- and external speech classification per frame C(i) from the Classification unit 5, and the set of frames j where transitions in speech were identified by the Dissimilarity Segmentation unit 6. In step S6, the unit 7 divides the binaural into segments based on the transition frames j. Then, in step S7, the unit 7 provides a final segmentation of the audio into self- and external speech segments of sufficient length and classification confidence.

For each segment k provided by the Dissimilarity Segmentation unit 6, the plurality of frames belonging to the segment are considered to determine if the segment is considered self-speech.

For example, "majority voting" may be applied to the classification per frame, so that the segment k is considered self-speech if the number of frames classified as self-speech CS(k) is greater than the number of frames classified as external speech CE(k), and vice versa. A confidence σ(k) for the segment k is determined based on the relative difference between the number of frames in the segment k having been classified as self-speech CS(k) and the number of frames in the segment k classified as external speech CE(k):

$$\sigma(k) = \frac{|CS(k) - CE(k)|}{N(k)},$$

where $N(k)$ is the total number of frames in the segment $k$, including the non-speech frames, i.e. $N(k)=CS(k)+CE(k)$.

A threshold $th_\sigma$ is defined so that segments with $\sigma<th_\sigma$ are considered uncertain.

The segmentation unit 7 may further merge adjacent segments in specific circumstances. For example, adjacent segments classified in the same class (self or external) and considered certain by the confidence criterion may be merged into a single segment. Similarly, adjacent uncertain segments may be merged to form a single uncertain segment. Segments shorter than a pre-defined duration can be merged with larger adjacent frames. Uncertain segments surrounded by two certain segments of the same class may be merged together with the adjacent segments into a single segment. Uncertain segments surrounded by two certain segments of different class (i.e. one self-speech and one external speech) may be merged to the longest adjacent segment.

Further, uncertain segments surrounded by two certain segments of different class (i.e. one self-speech and one external speech) may be used as transition regions in the following speech enhancement chain. For example, a short uncertain segment may be used as a cross-fade area for the transition between the different processing applied to the adjacent segments.

The final segmentation obtained by the unit 7 is passed to the speech-enhancement unit in a format that includes the transition points of each segment and the inferred class (self- or external speech). Alternative representations such as the starting points and durations of segments are also possible.

Segmentation-Based Speech Enhancement

The speech enhancement chain 8 may comprise signal-processing blocks that perform sibilance reduction, equalization, dynamic range compression, noise reduction, de-reverberation, and other processing. Often, the optimal amount and settings of each processing block can vary depending on the characteristics of the signal: typically, self- and external speech will benefit from a different equalization, independent leveling, a different amount of reverberation suppression, etc.

The segmentation into self- and external speech provided by the segmentation unit 7 can therefore be used to process the two classes of speech differently and achieve optimal audio quality.

Examples of segmentation-based processing include:

Equalization to compensate for the high-frequency loss in the recording of self-speech; the correction curve (gains per frequency band) can be measured, estimated or obtained by simulation, and then applied only to the self-speech segments.

Leveling: aligning the level and dynamic range of self- and external speech can be challenging if the content is considered as a whole unit. With segmentation, each segment can be leveled independently, thus ensuring the required loudness and dynamic range for each speaker.

Ambience suppression: ambience usually enhances immersiveness but reduces intelligibility. Ambience and reverberation suppression can be applied in high amounts to external speech to increase intelligibility, and in smaller amounts to self-speech to preserve immersiveness.

Binaural signal rotations to stabilize the perceived image by compensating the effect of head movement during recording: self-speech does not require stabilization (which would in fact be perceived as an undesired rotation), while external speech benefits from it.

Channel unbalance correction: earbuds may have inter-channel unbalance in the high frequency range, depending on how firmly the buds are placed in each ear canal. This can cause unvoiced part (sibilance) of self-speech to be located to source directions slightly away from center, and sounds less solid than a mono recording.

Compensating level difference between the left and right channel in affected high frequency bands can improve self-speech quality, whereas apply same processing to external speech may affect its spatial cues.

Once the segmentation data is available, the entire signal is divided into segments, and each segment is processed according to the inferred class. The segments may include extra frames at the boundaries for cross-fading by overlap when re-combining the processed segments. The settings used to process each frame are either based on different presets for the self- and external speech classes (e.g. for processes where a different treatment is required for self- and external speech, such as ambience suppression), or based on the same settings (e.g. for examples where the goal is obtaining homogeneous results, such as in the case of leveling).

In some implementations:

The classification of self- and external speech can be achieved by means of bone-conduction vibration sensors. In such implementations, the classifier can perform the classification based on bone-conduction vibration sensor data, in addition or alternative to using the features. For example, the classifier can classify audio as self-speech in response to detecting bone vibration corresponding to speech, or as external speech in response to detecting lack of bone vibration based on data from the bone-conduction vibration sensor. The bone-conduction vibration sensor data can thus supplement or replace the features.

The frame size used for MFCC, VAD and other features can be different; in such case, when combining different features, or different metrics derived from features, the coarser feature may be "up-sampled" to the resolution of the finest feature by interpolation or simple nearest-neighbor repetition.

Aspects of the systems described herein may be implemented in an appropriate computer-based sound processing network environment for processing digital or digitized audio files. Portions of the adaptive audio system may include one or more networks that comprise any desired number of individual machines, including one or more routers (not shown) that serve to buffer and route the data transmitted among the computers. Such a network may be built on various different network protocols, and may be the Internet, a Wide Area Network (WAN), a Local Area Network (LAN), or any combination thereof.

One or more of the components, blocks, processes or other functional components may be implemented through a computer program that controls execution of a processor-based computing device of the system. It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method comprising:
dividing a binaural speech signal into frames;
applying a time-frequency transform to each frame;
computing features of the frames based on a time-frequency representation;
classifying, by a classifier, each frame as self speech or external speech, based at least in part on a subset of features;
computing a dissimilarity function based on a subset of features;
segmenting the signal at peaks of the dissimilarity function;
for each segment, determining a respective overall class among self speech or external speech by aggregating classifier data of the frames belonging to the segment; and
processing each segment with a speech enhancement chain whose settings are based on determined overall class for such segment.

2. The method of claim 1, comprising computing a respective speech probability of each frame using voice action detection (VAD), wherein only frames where the speech probability is greater than a predefined value are taken into account for classification and segmentation.

3. The method of claim 1, wherein the features include at least one of energy per frequency band, spectral slope in a predefined frequency range, inter-channel coherence per frequency band, or Mel-Frequency Cepstral Coefficients.

4. The method of claim 1, wherein the classifier is a Support Vector Machine.

5. The method of claim 1, where the dissimilarity function is obtained by applying a Bayes Information Criterion (BIC) to a subset of the features.

6. The method of claim 5, comprising retaining peaks of the dissimilarity function conditioned upon a value of the dissimilarity function being greater than a predefined value, and a distance to the nearest peaks being greater than another predefined value.

7. The method of claim 1, wherein determining a respective overall class comprises:
computing a number of frames (CE) classified as external speech in a segment;
computing a number of frames (CS) classified as self-speech (CS) in a segment; and
assigning the class self-speech if CS>=CE, or the class external speech if CE>CS.

8. The method of claim 7, comprising assigning a respective classification confidence value to each segment using an expression abs (CE-CS)/N, N being total number of frames in the segment.

9. The method of claim 8, comprising designating as uncertain a segment whose confidence value is less than a predefined value.

10. The method of claim 9, comprising:
merging adjacent segments of same class into a single segment of the same class; and
merging a segment designated as uncertain and surrounded by two segments of a same class (self or external) with the surrounding segments.

11. The method of claim 1, wherein processing each segment with a speech enhancement chain includes one or more of:
noise estimation and noise reduction;
equalization, including a specific filter for self-and external speech;
leveling, including a specific target level and dynamic range for self-and external speech;
ambience balance, including a different amount of boost or attenuation for self- and external speech;
spatial rotations, including a different amount of rotation for self- and external speech; and
channel unbalance correction, including a different amount of correction for self- and external speech.

12. The method of claim 11, wherein:
a segment that is:
designated as uncertain;
surrounded by two segments of different classes (one self, one external); and
shorter than a predefined length;
is processed with both settings and used as a cross-fade region; and
a segment that is:
designated as uncertain;
surrounded by two segments of different classes (one self, one external); and
longer than a predefined length
is processed with a neutral setting, or merged with the longest neighboring segment.

13. The method of claim 11, comprising:
recombining processed segments into a sequence according to their order in an original input; and
reducing audible discontinuities by applying cross fading at transition points.

14. A system comprising:
one or more processors; and
a non-transitory computer readable medium storing instructions that, when executed by the one or more processors, cause the one or more processors to perform operations claim 1.

15. A non-transitory computer readable medium storing instructions that, when executed by one or more processors, cause one or more processors to perform operations of claim 1.

* * * * *